Aug. 30, 1960 A. J. RUSCITO 2,951,002
METHOD OF MAKING AN ELECTRICAL CONDENSER
Filed Sept. 28, 1951

INVENTOR
Anthony J. Ruscito
BY
Dale A. Bauer
ATTORNEY

United States Patent Office 2,951,002
Patented Aug. 30, 1960

2,951,002
METHOD OF MAKING AN ELECTRICAL CONDENSER

Anthony J. Ruscito, Unadilla, N.Y., assignor to The Bendix Corporation, a corporation of Delaware Filed Sept. 28, 1951, Ser. No. 248,698

5 Claims. (Cl. 154—80)

This invention relates to electrical apparatus and more particularly to electrical condensers or capacitors and methods for fabricating the same.

One of the objects of the present invention is to provide a novelly constructed electrical condenser which has better physical and electrical characteristics and properties than condensers heretofore made of the same or equivalent materials.

Another object is to provide a novel method for fabricating electrical condensers or capacitors which permits the use of more viscous impregnating compounds and hence the use of a broader range or selection of such compounds to insure the best possible electrical and physical characteristics.

Still another object is to provide a novel spirally wound condenser of the type embodying foil sheets separated by sheet insulation, such as paper.

A further object is to provide a novel electrical condenser which has higher capacity and is capable of withstanding higher temperatures and voltages than prior known condensers of the same size and weight.

Still another object is to provide a condenser which is novelly so constructed and shaped that a plurality thereof may be installed in a minimum of space for connection in the same or different electrical circuits.

A still further object is to provide a condenser wherein the terminals for the plates thereof are incorporated in the structure in a novel and simplified manner.

Another object is to provide a novel, high quality condenser and a novel method of making the same at relatively low cost.

The above and further objects and novel features of the invention will more fully appear from the following detail description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, Fig. 1 is an end view illustrating a condenser or capacitor in the process of being wound;

Figure 1:
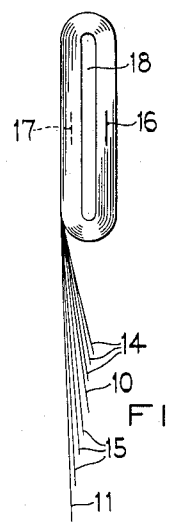
Figure 2:
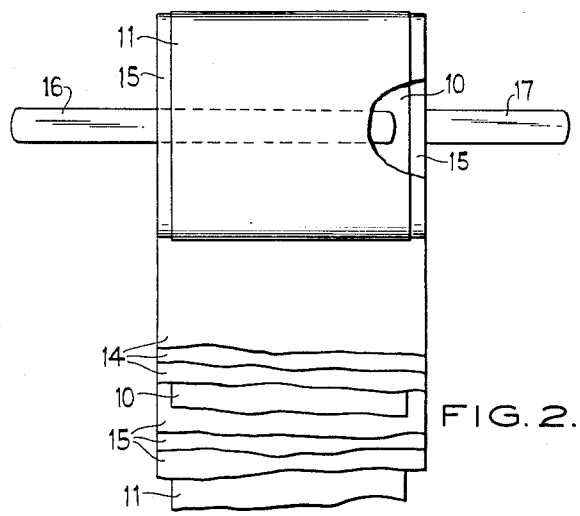
Fig. 2 is a side view of a partially wound condenser.

The so-called condenser or capacitor discharge type of ignition system for combustion engines has come into quite common use in recent years, particularly on so-called jet or gas turbine engines for aircraft where a high energy spark is required. In these systems a condenser is repeatedly charged and discharged to create the necessary ignition sparks having high energy. Accordingly, the condenser is an essential part of such ignition systems and failure thereof is likely to result in failure of the engine and consequent loss of life or severe injury to personnel and destruction of valuable aircraft or other property. It is therefore an important object of this invention to improve this essential element of the present-day ignition systems by making the same more efficient and more durable under most severe operating conditions.

The embodiment of the invention illustrated in the drawings and hereafter described in detail, by way of example only, is a condenser having a capacity of one microfarad and adapted for use as a storage condenser in an engine ignition system. The conductive plates of the condenser are constituted by two strips 10 and 11 of thin metal foil. Aluminum foil having a thickness of about .00025 inch has been found satisfactory in one commercial embodiment. These strips are preferably of equal width and are spirally wound directly over each other but separated and insulated from each other by two layers 14 and 15 of suitable insulating material, such as paper, each layer as shown in the exemplary embodiment comprising three sheets. Each insulating sheet is preferably of hard calendered kraft paper stock about .0003 inch thick and sufficiently wide to extend about .025 inch beyond both edges of the foil sheets 10 and 11, but other known forms of sheet insulation may be used. The foil sheets are preferably longitudinally offset about a half inch so the adjacent ends thereof will be staggered in a like amount. The foil sheets are, of course, insulated from each other throughout by insulating layers 14 and 15 and a few of the outermost turns are preferably free of foil.

Figure 3:
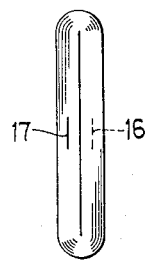
Fig. 3 is an end view of one form of a finished condenser embodying and made in accordance with the present invention.

Terminals 16 and 17 preferably extend from laterally opposed halves and opposed ends of the condenser. Said terminals may consist of thin strips of metal, one in contact with one foil plate 10 and the other in contact with foil plate 11. The terminal strips may be loosely inserted in the positions shown when the condenser has been approximately half wound. When the condenser has been impregnated and compressed in the novel manner hereinafter described, the terminals will make excellent contact with the foil layers and be well secured in position without the use of solder or the like. The wound layers of foil and insulating sheets are impregnated and retained in a substantially flat or out-of-round shape by an insulating compound which is applied in a manner to be hereinafter described. The layers of foil and insulating paper are tightly compressed to a flat shape (Fig. 3) with the compound filling the pores and interstices in the paper layers, thereby improving the insulating properties thereof. The paper layers are not stressed by the action of the impregnating compound and the density thereof is rendered substantially greater by compression than it was before fabrication of the condenser.

The novel method comprehended by this invention for fabricating a condenser of the above description includes tightly winding the foil layers 10 and 11 and paper or other insulating layers 14 and 15 on a flat, highly polished mandrel 18, as illustrated in Fig. 1. To facilitate removal of the mandrel after the winding of the condenser, the edges of the mandrel may be very slightly tapered, such as to the extent of about .001 inch per inch of length. When winding the two layers of foil and two triple layers of insulation so that there is a layer of insulation between the foil strips at all points, care should be taken to avoid any wrinkles. When about half the length of the paper and foil strips have been wound, the terminal strips 16 and 17 are inserted in the positions illustrated. These leads or terminals should be smooth and free of burrs and the paper and foil strips should be clean and free of any particles which might rupture the paper or foil under compression. The winding should be carried out in a room free from dust or similar particles of foreign matter in the air. When the desired number of turns have been wound, the foil layers are cut with the adjacent ends thereof staggered about a half inch or more and at least the outside paper is wound to completely cover the outside foil and secured with a minimum of adhesive compound to prevent unwinding of the turns during further fabrication.

Figure 4:
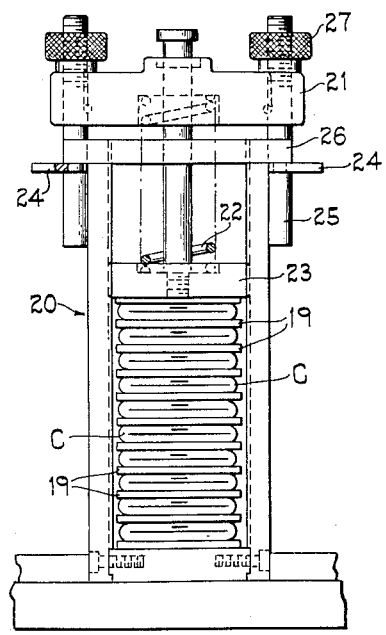
Fig. 4 is a side view of a fixture adapted for use in making condensers in accordance with the invention.

The condenser is now slipped off the mandrel so that when the sides thereof are lightly pressed toward each other to close the opening left by the mandrel, the layers of foil and paper will assume a loosely wound condition. The loosely wound condenser C is now supported between two flat, smooth plates or spacers 19 of fluorine polymer or the equivalent, each large enough to protrude beyond the condenser on all four sides. The plates should be clean and free from nicks, mars or any contamination and made of a material to which the impregnating compound will not adhere. If desired, a plurality of condensers C may be stacked one above the other in a suitable fixture 20 with a supporting plate 19 between each pair. The plates 19 are initially individually supported in somewhat wider spaced relation to each other than is illustrated in Fig. 4, in any suitable manner, such as by notched standards that removably cooperate with fixture 20 but are not shown in the drawing. These condensers, thus loosely stacked or supported, are dried in a convection oven or the like at about 190° F. for about 15 hours or more and at about the same temperature for about 24 hours or more in an impregnating tank or chamber evacuated to about one-half inch of mercury absolute pressure or less.

The condensers are now ready for impregnation with a suitable insulating compound which may be applied in liquid or viscous form and then permitted or caused to set to a relatively rigid or yieldable form. One suitable compound of the many which may be used for this purpose comprises about 18.5 parts by weight of styrene monomer, 81.5 parts by a casting resin, such as Rohm and Haas Company Paraplex P-13 which consists of equal parts of styrene monomer and polyester monomer, and 3 parts of a catalyst, such as lauroyl peroxide, a suitable form thereof being commercially known as Lucidol Alperox C. The catalyst speeds up the polymerization of the casting resin.

Impregnation of the condensers may be effected in the vacuum chamber in which the condensers are dried, preferably while said chamber is evacuated to about one-half inch of mercury absolute pressure or less after the fixture supporting the condensers has cooled to a temperature below about 80° F. Cooling of the chamber and fixture may be effected in any suitable manner, such as by circulating a coolant in the heating coils. The dried condensers may be moved from the drying oven to a different impregnating chamber but this is not preferable. The evacuated impregnating chamber, when cooled, is flooded with the impregnating compound which is in liquid or viscous form at a temperature between approximately 45° F. and 70° F. The compound before being introduced into the impregnating chamber is preferably stirred under vacuum for the purpose of removing air and other gases therefrom.

After the loosely wound condensers have been thus thoroughly saturated, the same are removed from the impregnating chamber and placed under spring or gaseaus type pressure of about 50 to 100 lbs. per square inch. The pressure is applied to the end-most separating or supporting plates and for best results should be applied gradually in increments over a period of about 15 minutes to permit suitable flow of the impregnating compound and avoid undesirable stresses of the layers. This gradual application of pressure forces excess compound from between the layers of the condensers and insures the absence of air or vapor bubbles. Additionally, the compound is pressed into the pores or interstices of the materials making up the condenser and compresses to beyond its original state of density the paper insulating layers which may have been swollen or expanded by the liquid impregnating compound. The pressure also removes the compound from between each of the terminal strips 16, 17 and the adjacent condenser plates 10, 11 to insure good electrical contact therebetween. Close contact between the paper and foil strips is also insured thereby bringing the condenser plates 10, 11 as close together as possible in order to increase the capacity of the condenser and to improve its other electrical and physical characteristics and properties. It may be desirable to support the condensers for a few minutes in such a position as to permit excess compound to drain from the ends of the coils, i.e., from between the projecting edges of the paper insulating layers which are not under full compression.

When fixture 20 is used, the initial pressure for compressing the condensers to remove excess compound and effect other advantageous results herein mentioned may be applied mechanically, hydraulically or in any other suitable manner to yoke 21 and thence through a coil spring 22 to a pressure plate 23 slidably supported in the fixture and engaging uppermost plate 19. When the desired pressure has been gradually attained, the spring 22 is maintained under compression between yoke 21 and plate 23 by stop clips 24 which extend into slots in pins 25 and engage the lower face of fixed plate 26. The pins 25 may be adjusted to the proper vertical position by nuts 27 before the downward pressure on yoke 21 is released. It will be understood that if supports or standards are used for spacing plates 19 during the drying process, the same must be removed before the compression pressure is applied so that each condenser will be pressed between two plates 19.

While thus held under compression by spring 22 or some other suitable form of expanding pressure, the compressed condensers are preferably baked to accelerate polymerization or setting of the remaining impregnating compound. When a compound of the nature described above is used, baking may be at a temperature of about 160° F. to 180° F. for about 14 to 16 hours during which time the spring or other pressure should preferably not be permitted to decrease appreciably. This result may be effected by properly designing the spring in the light of the further compression of the condensers which results from the shrinkage of the compound and compression of the paper during the baking and hence, drying and setting process. The continuous application of pressure during the setting of the compound avoids the creation of physical stresses in and possible rupture of the insulating layers which are apt to otherwise result from the contraction of the compound and from the uneven curing and cooling which results from inability to heat and cool all of the layers uniformly. The outside layers cure and cool before the inside layers, and without the aid of the external pressure the inside layers would tend to pull away from the outer layers, causing irreparable damage or stresses which reduce the resistance of the insulation to electrical breakdowns or rupture.

After baking, the condensers are permitted to cool to room temperature under continued pressure of spring 22. The same are then removed from the fixture and any compound on the exposed ends of terminals 16, 17 is cleaned off with a suitable solvent. The condensers are now ready for use and for best results should be housed in a moisture tight casing or coating.

There is thus provided a novelly constructed electrical condenser or capacitor in the form of a solid and dense mass which is entirely free of internal voids or air pockets and wherein the layers are free of detrimental internal stresses. Said condenser is capable of withstanding higher temperatures and higher voltages than heretofore known condensers of comparable size and weight and has higher insulation resistance than any previously known condenser of comparable capacity. In comparison to known structures, said condenser permits less electrical losses, possesses a better power factor and has less corona. The invention also comprehends a novel method for making condensers to endow them with the above advantages. Condensers made in accordance with said method are extremely reliable and will function efficiently and effectively for longer periods of time under severe operating conditions than known types of condensers adapted for the same purposes and uses. Said condensers are physically durable as well as electrically superior.

Although only a limited number of embodiments of or variations in the condenser and method comprehended by the invention have been illustrated in the drawings and described in the foregoing specification, it is to be expressly understood that the invention is not so limited. Various changes and modifications which do not depart from the spirit and scope of the invention will now be apparent to those skilled in the art.

What is claimed is:

1. The method of making an electrical condenser which includes loosely winding layers of sheet metal with layers of sheet insulation therebetween, impregnating said loosely wound condenser under vacuum with a flowable, heat settable, synthetic resin compound which is adapted to shrink upon solidification, subjecting two opposed sides only of said condenser to pressure between substantially flat surfaces which are movable toward each other by said pressure while the compound is flowable and without restriction other than the condenser itself, said pressure being sufficient to fully compress and flatten the condenser to expel excess compound and press adjacent layers into close engagement, and continuing the application of said pressure with heating until the compound remaining in the condenser solidifies.

2. A method as defined in claim 1 wherein said layers are tightly wound on a mandrel and the latter is removed from the wound condenser before the condenser is impregnated.

3. A method as defined in claim 1 including the step of drying the condenser in a heated chamber before the condenser is impregnated.

4. A method as defined in claim 1 including heating the condenser under vacuum in a chamber to dry the condenser before impregnation, cooling said condenser in the chamber, and then impregnating the condenser.

5. A method as defined in claim 1 wherein said impregnating compound is in liquid form when first applied to the condenser and is capable of setting to solid form.

References Cited in the file of this patent

UNITED STATES PATENTS

| | | |
|---|---|---|
| 719,973 | Wotton | Feb. 3, 1903 |
| 774,115 | Splitdorf | Nov. 1, 1904 |
| 1,706,816 | Pickard | Mar. 26, 1929 |
| 1,726,343 | Danziger | Aug. 27, 1929 |
| 1,746,469 | Gruno | Feb. 11, 1930 |
| 1,829,015 | Reiher | Oct. 27, 1931 |
| 1,842,648 | Bartel | Jan. 26, 1932 |
| 2,014,399 | Sprague | Sept. 17, 1935 |
| 2,107,780 | Danziger | Feb. 8, 1938 |
| 2,303,283 | Kirkwood et al. | Nov. 24, 1942 |
| 2,495,167 | Horstman et al. | Jan. 17, 1950 |
| 2,506,026 | Kifer et al. | May 2, 1950 |
| 2,534,994 | Scott et al. | Dec. 19, 1950 |

FOREIGN PATENTS

| | | |
|---|---|---|
| 416,735 | Great Britain | Sept. 20, 1934 |